United States Patent
Uchiyama (10) Patent No.: US 10,137,623 B2
(45) Date of Patent: Nov. 27, 2018

(54) INJECTION MOLDING SYSTEM

(71) Applicant: FANUC Corporation, Yamanashi (JP)

(72) Inventor: Tatsuhiro Uchiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 240 days.

(21) Appl. No.: 15/162,617

(22) Filed: May 24, 2016

(65) Prior Publication Data

US 2016/0346979 A1  Dec. 1, 2016

(30) Foreign Application Priority Data

May 25, 2015  (JP) ................. 2015-105126

(51) Int. Cl.
*B29C 45/76* (2006.01)
*B29C 45/17* (2006.01)

(52) U.S. Cl.
CPC ...... *B29C 45/7686* (2013.01); *B29C 45/1769* (2013.01); *B29C 2945/7629* (2013.01); *B29C 2945/76083* (2013.01); *B29C 2945/76163* (2013.01); *B29C 2945/76321* (2013.01); *B29C 2945/76464* (2013.01); *B29C 2945/76939* (2013.01)

(58) Field of Classification Search
CPC ........... B29C 2945/76083; B29C 2945/76163; B29C 2945/7629; B29C 2945/76321; B29C 2945/76464; B29C 2945/76939; B29C 45/1769; B29C 45/7686
See application file for complete search history.

(56) References Cited

U.S. PATENT DOCUMENTS

| 5,817,988 A | 10/1998 | Suzuki | |
|---|---|---|---|
| 2015/0239186 A1* | 8/2015 | Van Dijk | B29D 11/00182 264/2.5 |

FOREIGN PATENT DOCUMENTS

| JP | 3-207616 A | 9/1991 |
|---|---|---|
| JP | 3-266621 A | 11/1991 |
| JP | 4-338520 A | 11/1992 |
| JP | 5-77296 A | 3/1993 |
| JP | 8-57430 A | 3/1996 |
| JP | 2002-46146 A | 2/2002 |
| JP | 2002-361721 A | 12/2002 |

(Continued)

OTHER PUBLICATIONS

Electronic translation of JP 03-207616 (Year: 2018).*
Decision to Grant a Patent in JP Application No. 2015-105126, dated Jul. 18, 2017, pp. 6.

*Primary Examiner* — Jill L Heitbrink
(74) *Attorney, Agent, or Firm* — Hauptman Ham, LLP (57) ABSTRACT

A injection molding system extracts molding data and inspection data having a difference between a first position information of a conveyance part where a molded article produced by an injection molding apparatus is picked up by a conveyor device and a second position information of the conveyance part where the molded article is inspected by an inspection device is equal to a predetermined distance between a pickup position and an inspection position, and stores the molding data and the inspection data in association with each other as a set. This configuration makes it possible to associate molding data of an injection molding apparatus when producing a molded article and inspection data with each other to control the quality of molded articles.

8 Claims, 5 Drawing Sheets

(56) References Cited

FOREIGN PATENT DOCUMENTS

| | | | |
|---|---|---|---|
| JP | 2003-291145 | A | 10/2003 |
| JP | 2006-248038 | A | 9/2006 |
| JP | 2008-36917 | A | 2/2008 |
| JP | 2008-262378 | A | 10/2008 |
| JP | 2009-193408 | A | 8/2009 |
| JP | 2009-210445 | A | 9/2009 |
| JP | 2013-86358 | A | 5/2013 |
| JP | 2015-1380 | A | 1/2015 |
| JP | 2015-1468 | A | 1/2015 |

* cited by examiner

| NUMBER OF SHOTS | MOLDING DATA M0 | MOLDING DATA M1 | MOLDING DATA Mm | PICKUP TIME DATA t1 |
|---|---|---|---|---|
| 1 | M0(1) | M1(1) | Mm(1) | t1(1) |
| 2 | M0(2) | M1(2) | Mm(2) | t1(2) |
| 3 | M0(3) | M1(3) | Mm(3) | t1(3) |
| ... | ... | ... | ... | ... |
| N | M0(N) | M1(N) | Mm(N) | t1(N) |

FIG.4B

| NUMBER OF SHOTS | INSPECTION DATA T0 | INSPECTION DATA T1 | INSPECTION TIME DATA t2 |
|---|---|---|---|
| 1 | T0(1) | T1(1) | t2(1) |
| 2 | T0(2) | T1(2) | t2(2) |
| 3 | T0(3) | T1(3) | t2(3) |
| ... | ... | ... | ... |
| N-1 | T0(N-1) | T1(N-1) | t2(N-1) |
| ... | ... | ... | ... |

MOVING TIME BETWEEN PICKUP POSITION AND INSPECTION POSITION IS |t1(1)-t2(6)|

FIG.4C

| NUMBER OF SHOTS | MOLDING DATA M0 | MOLDING DATA M1 | MOLDING DATA Mm | INSPECTION DATA T0 | INSPECTION DATA T1 |
|---|---|---|---|---|---|
| 1 | M0(1) | M1(1) | Mm(1) | T0(6) | T1(6) |
| 2 | M0(2) | M1(2) | Mm(2) | T0(7) | T1(7) |
| 3 | M0(3) | M1(3) | Mm(3) | T0(8) | T1(8) |
| ... | ... | ... | ... | ... | ... |
| N-1 | M0(N-1) | M1(N-1) | Mm(N-1) | T0(N+4) | T1(N+4) |
| N | M0(N) | M1(N) | Mm(N) | T0(N+5) | T1(N+5) |

FIG.5

INJECTION MOLDING SYSTEM

RELATED APPLICATIONS

The present application claims priority to Japanese Patent Application Number 2015-105126, filed May 25, 2015, the disclosure of which is hereby incorporated by reference herein in its entirety.

BACKGROUND OF THE INVENTION

1. Field of the Invention

The present invention relates to an injection molding system, and particularly, to an injection molding system including an injection molding apparatus, a conveyor device configured to convey molded articles produced by the injection molding apparatus, and an inspection device configured to inspect the molded articles conveyed by the conveyor device.

2. Description of the Related Art

To detect a defective article generated in molded articles produced by an injection molding apparatus, each molded article must be determined as non-defective or as defective. Whether a molded article is non-defective or defective can be determined by directly inspecting the molded article by visual observation with human eyes or by using machines. Alternatively, instead of such direct inspection, the quality of a molded article can be indirectly determined by examining physical quantities such as an injection pressure, an injection speed, a position, and a temperature when producing a molded article in the injection molding apparatus.

More specifically, a molded article can be directly inspected to determine the quality by measuring the physical quantity such as size or weight of the molded article to find whether or not the measured value is within an allowable range, and by visually inspecting the appearance of the molded article by a vision sensor or by human eyes.

JP 03-207616 A discloses a molded article inspection apparatus in which an injection molding apparatus automatically determines the quality of a molded article. In the molded article inspection apparatus, the weight of a molded article extracted at every shot of the injection molding apparatus is measured automatically. The quality of the molded article is determined by fetching the measured value of the weight together with a plurality of monitored items such as a primary pressure, a secondary pressure, and a primary injection time.

JP 2002-46146 A discloses an injection molding apparatus for molding a connector housing as a resin product and a conveyor belt for receiving and conveying the resin products dropped from the injection molding apparatus. JP 2002-46146 A also discloses a weight inspection device for inspecting the weight of a molded connector housing after conveyed by the conveyor belt.

According to the technique disclosed in JP 03-207616 A, a molded article is subjected to direct inspection immediately after molding by the injection molding apparatus. Thus, the relationship between the molding data of the injection molding apparatus and the quality of an actual molded article measured by the inspection is made clear by collecting the inspection data obtained by the inspection and the molding data for producing a molded article in association with each other as a set. By feeding back the relationship between the molding data and the inspection data, improvement of the quality of the molded articles is facilitated. However, a cycle time may increase by the time required for inspection as the inspection is performed immediately after the injection molding apparatus produces a molded article. In addition, even though the inspection is performed immediately after molding at which a molded article is not sufficiently solidified, the state of the molded article may have changed at the time when the molded article is completely solidified.

According to the technique disclosed in JP 2002-46146 A, a molded article produced by the injection molding apparatus is conveyed by the conveyor belt to an inspection place of the inspection device to be subjected to inspection. This may cause difficulty in storing the results of inspection by the inspection device and molding data of the injection molding apparatus when producing a molded article in association with each other, since inspection of a molded article is delayed from the timing at which a molded article is produced for a time period until the molded article is conveyed by the conveyor belt to the inspection place, and is performed separately at a different place.

SUMMARY OF THE INVENTION

An object of the present invention is to provide an injection molding system capable of associating molding data of an injection molding apparatus when producing a molded article and inspection data with each other to control the quality of molded articles even when a timing of inspecting a molded article is different from that of producing a molded article.

An injection molding system according to the present invention includes: an injection molding apparatus; a conveyance means configured to convey a molded article produced by the injection molding apparatus; an inspection means configured to inspect the molded article conveyed by the conveyance means; a conveyance position detection means configured to detect a position of a conveyance part of the conveyance means; and a data storage means configured to store data, wherein the data storage means stores: molding data when the injection molding apparatus produces the molded article; and first position information of the conveyance part that is a position of the conveyance part detected by the conveyance position detection means when the produced molded article is picked up by the conveyance means, the molding data and the first position information of the conveyance part being stored in association with each other as a set, a plurality of sets of the molding data and the first position information being stored in the data storage means, wherein the data storage means stores: inspection data when a molded article is inspected by the inspection means; and second position information of the conveyance part that is a position of the conveyance part detected by the conveyance position detection means when the molded article is inspected by the inspection means, the inspection data and the second position information of the conveyance part being stored in association with each other as a set, a plurality of sets of the inspection data and the second position information of the conveyance part being stored in the data storage means, and wherein the data storage means extracts a set of the molding data and the first position information of the conveyance part and a set of the inspection data and the second position information of the conveyance part of which the first position information and the second position information of the conveyance part have a difference equal to a predetermined distance between a pickup position where the molded article is picked up by the conveyance means and an inspection position where the molded article is inspected by the inspection means, respectively from the plurality of sets of the molding data and the first position information of the conveyance part and the plurality of sets of the inspection data and the second position information of the conveyance part, and stores the molding data included in the extracted set of the molding data and the first position information and the inspection data included in the extracted set of the inspection data and the second position information in association with each other.

This configuration makes it possible to surely associate the molding data and the inspection data with each other to control molded articles, even when a timing of producing a molded article and a timing of inspecting the molded article are different from each other.

An injection molding system according to the present invention includes: an injection molding apparatus; a conveyance means configured to convey a molded article produced by the injection molding apparatus; an inspection means configured to inspect the molded article conveyed by the conveyance means; a time detection means configured to detect current time; and a data storage means configured to store data, wherein the data storage means stores: molding data when the injection molding apparatus produces a molded article; and first time information that is a time detected by the time detection means when the produced molded article is picked up by the conveyance means, the molding data and the first time information being stored in association with each other as a set, a plurality of sets of the molding data and the first time information being stored in the data storage means, wherein the data storage means stores: inspection data when a molded article is inspected by the inspection means; and second time information that is a time detected by the time detection means when the molded article is inspected by the inspection means, the inspection data and the second time information being stored in association with each other as a set, a plurality of sets of the inspection data and the second time information being stored in the data storage means, and wherein the data storage means extracts a set of the molding data and the first time information and a set of the inspection data and the second time information of which the first time information and the second time information have a difference equal to a moving time required to move between a pickup position where the molded article is picked up by the conveyance means and an inspection position where the molded article is inspected by the inspection means, respectively from the plurality of sets of the molding data and the first time information and the plurality of sets of the inspection data and the second time information, the moving time being obtained based on a distance between the pickup position and the inspection position and a conveyance speed of the conveyance means, and stores the molding data included in the extracted set of the molding data and the first time information and the inspection data included in the extracted set of the inspection data and the second time information in association with each other.

This configuration makes it possible to surely associate the molding data and the inspection data with each other to control molded articles, even when a timing of producing a molded article and a timing of inspecting the molded article are different from each other.

The inspection means may include an inspection device configured to inspect the molded article and a moving means configured to move the molded article, the moving means may move the molded article from the inspection position to the inspection device, and the inspection device may inspect the molded article moved by the moving means and obtains the inspection data.

The moving means may be a robot.

This configuration makes it possible to reliably perform inspection even when an inspection device can hardly perform inspection on a conveyor device such as when measuring the weight and the size of the molded article.

An injection molding system according to the above aspects of the invention can associate molding data of an injection molding apparatus when producing a molded article and inspection data with each other to control the quality of molded articles even when a timing of inspecting a molded article is different from that of producing a molded article.

BRIEF DESCRIPTION OF THE DRAWINGS

The foregoing and other objects and features of the invention will be apparent from the following description of the embodiments taken in conjunction with the accompanying drawings, in which.

DETAILED DESCRIPTION OF THE PREFERRED EMBODIMENTS

First Embodiment

Figure 1:
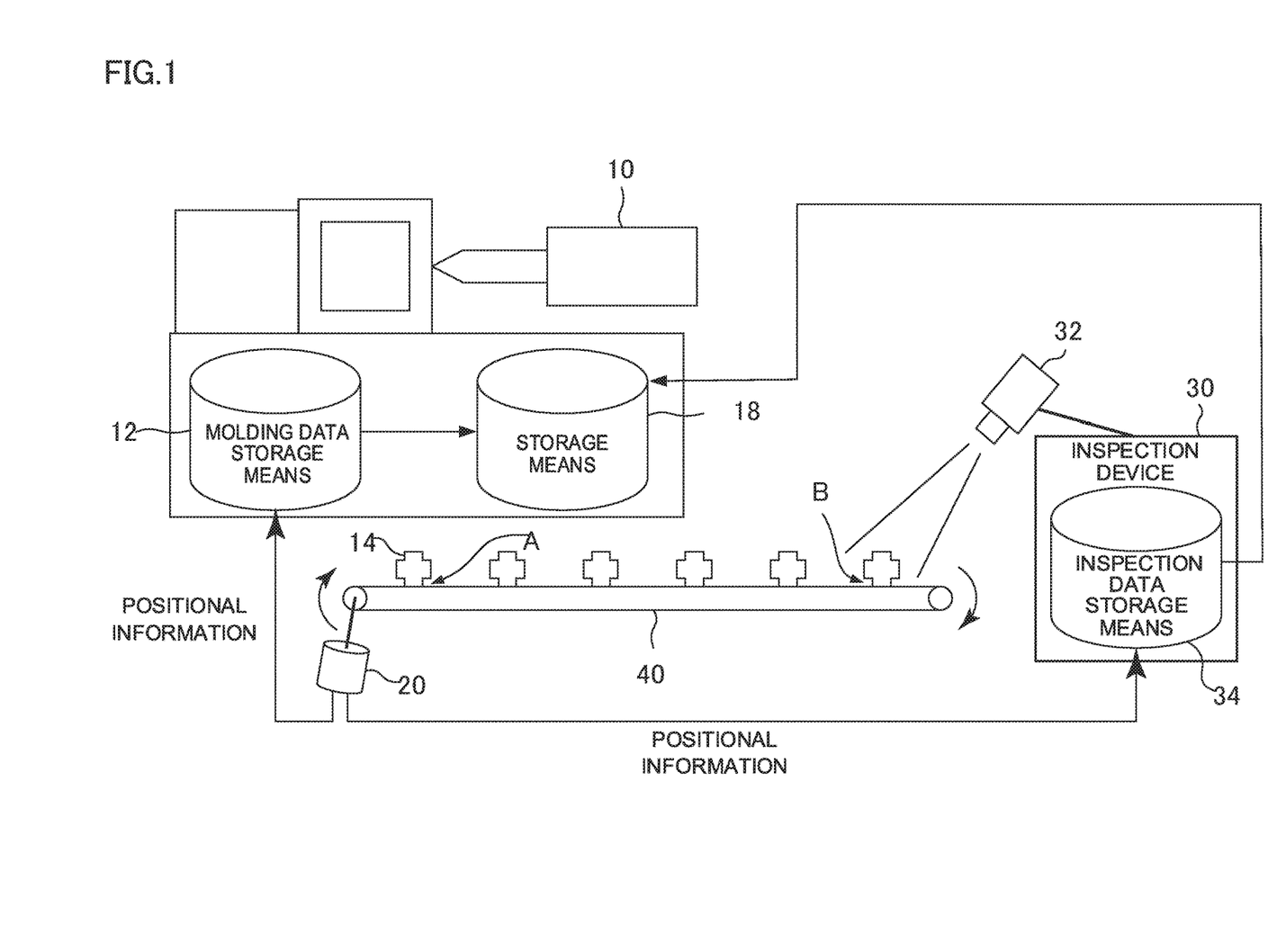
FIG. 1 is a view showing a configuration of an injection molding system according to an embodiment of the invention.

FIG. 1 is a view showing a configuration of an injection molding system according to an embodiment.

In an injection molding apparatus 10, which may be a conventional known injection molding apparatus, a mold clamping device performs mold clamping and mold closing, and then a resin material is injected into a mold by a cylinder or a screw of an injection device to produce a molded article 14. The produced molded article is ejected from the mold by an ejection device after opening the mold, and picked up to the outside of the injection molding apparatus 10. In this embodiment, the molded article 14 is picked up from the injection molding apparatus 10 onto a molded article pickup position A of a conveyor 40 as described below.

The injection molding apparatus 10 includes a molding data storage means 12 and a storage means 18. The molding data storage means 12 stores molding data for producing a molded article in the injection molding apparatus 10 and the storage means 18 stores sets of molding data and inspection data.

The conveyor 40 runs clockwise in FIG. 1, and the upper surface of the conveyor 40 moves from the left side toward the right side in the figure. The molded article 14 picked up onto the molded article pickup position A of the conveyor 40 is conveyed by the conveyor 40 toward the right side with lapse of time.

The molded article 14 conveyed by the conveyor 40 from the molded article pickup position A is carried to a molded article inspection position B. The molded article 14 is subjected to inspection at the molded article inspection position B by being imaged by a camera 32 provided on an inspection device 30. The results of the inspection are stored as inspection data in an inspection data storage means 34 provided in the inspection device 30.

The reference numeral 20 denotes a position detection means that detects a position of a conveyance part of the conveyor 40 by using an encoder or the like attached to the conveyor 40. A position of the conveyance part to be detected by the position detection means 20 is a rotational position of a belt stretched around the conveyor 40 that is the conveyance part of the conveyor 40. The position is detected based on a reference mark added to a part of the belt, for example. Thus, the position of the conveyance part is not a position of the molded article 14 placed on the conveyance part.

When a molded article 14 is picked up by the conveyor 40 after being molded by and ejected from the injection molding apparatus 10, the position detection means 20 detects a position of the conveyance part at that time as a first position of the conveyance part and transmits the information on the first position of the conveyance part to the molding data storage means 12. The molding data storage means 12 to which the information on the first position of the conveyance part has been transmitted stores the transmitted information on the first position of the conveyance part in association with the molding data regarding the molded article 14 as a set. These steps are repeated every time the molded article 14 is molded and picked up by the conveyor 40.

The molded article 14 conveyed by the conveyor 40 is subjected to inspection such as an appearance inspection and a size inspection based on image processing by the camera 32 of the inspection device 30 at a molded article inspection position B. The position detection means 20 detects a position of the conveyance part as a second position of the conveyance part at the time of inspection of the molded article 14 by the inspection device 30 and transmits the information on the second position of the conveyance part to an inspection data storage means 34. The inspection data storage means 34 to which the information on the second position of the conveyance part has been transmitted stores the transmitted information on the second position of the conveyance part in association with the inspection data regarding the molded article as a set. These steps are repeated every time the molded article 14 is conveyed and inspected by the inspection device 30 at the molded article inspection position B.

Here, a distance between the molded article pickup position A and the molded article inspection position B is set in advance. A set of data is extracted from each of the sets of the molding data and the information on the first position of the conveyance part stored in the molding data storage means 12 and the sets of the inspection data and the information on the second position of the conveyance part stored in the inspection data storage means 34 in such a manner that a difference between the information on the first position of the conveyance part and the information on the second position of the conveyance part is equal to the predetermined distance between the molded article pickup position A and the molded article inspection position B, and the extracted sets of data are stored in the storage means 18.

Figure 2A:
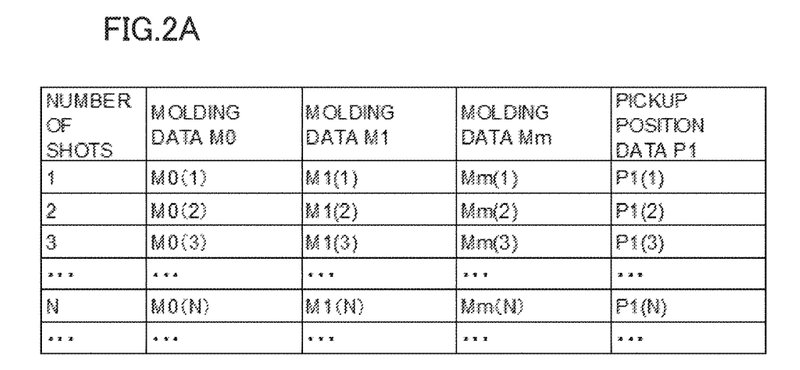
FIG. 2A is a view showing a storage structure of data in each storage means and showing sets of molding data and pickup position data stored in a molding data storage means.
Figure 2B:
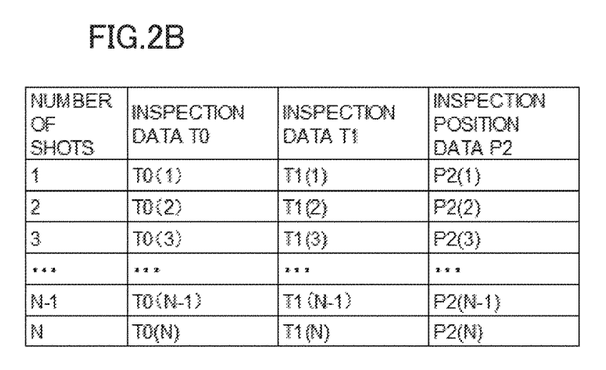
FIG. 2B is a view showing a storage structure of data in each storage means and showing sets of inspection data and inspection position data stored in an inspection data storage means.
Figure 2C:
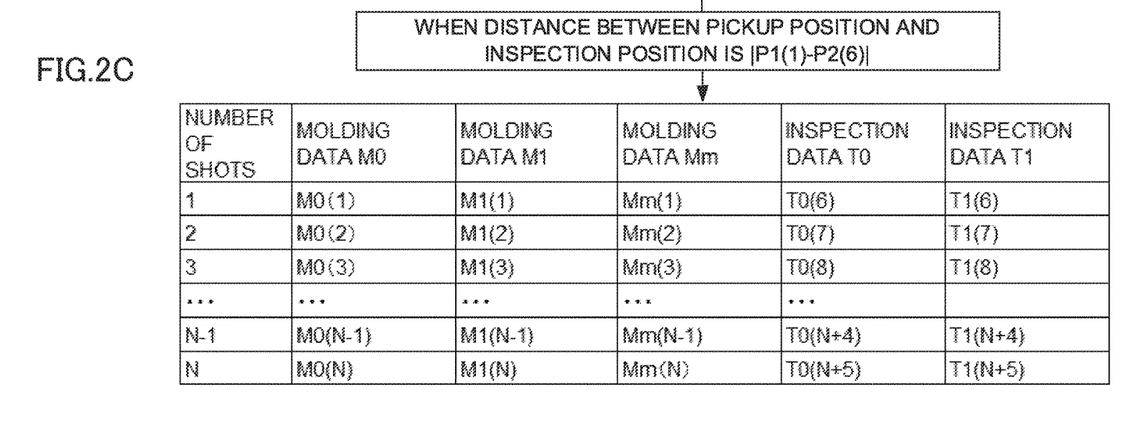
FIG. 2C is a view showing sets of data stored in a storage means.

FIGS. 2A, 2B, and 2C each shows a storage structure of data in each of the storage means according to this embodiment. FIG. 2A shows sets of molding data and pickup position data (the data of the first position of the conveyance part) stored in the molding data storage means 12. For example, the molding data $M0(1)$, $M1(1)$, ... $Mm(1)$ at the time when the number of shots is 1 are stored in association with $P1(1)$ that is the pickup position data P1 at that moment. When the number of shots is 2, the molding data $M0(2)$, $M1(2)$, ... $Mm(2)$ are stored in association with $P1(2)$ that is the pickup position data P1 at that moment. Likewise, the molding data and the pickup position data are stored thereafter, and the molding data $M0(N)$, $M1(N)$, ... $Mm(N)$ at the time when the number of shots is N are stored in association with $P1(N)$ that is the pickup position data P1 at that moment.

The conveyor 40 is operated every time the molded article 14 is picked up by the conveyor 40 or is always operated at a constant speed. The inspection device 30 performs inspection as the molded article 14 is conveyed to the molded article inspection position B. FIG. 2B shows sets of the inspection data and inspection position data (the data of the second position of the conveyance part) stored in the inspection data storage means 34. The inspection data $T0(1)$, $T1(1)$, ... obtained by the inspection are stored in association with $P2(1)$ that is the inspection position data P2 at that moment. Likewise, the inspection data $T0(2)$, $T1(2)$, ... are stored in association with $P2(2)$ that is the inspection position data P2. Likewise, the inspection data and the inspection position data are stored thereafter, and the inspection data $T0(N)$, $T1(N)$, ... are stored in association with $P2(N)$ that is the inspection position data P2 at that moment.

In this embodiment, a distance between the molded article pickup position at the time of producing and picking up the molded article and the molded article inspection position at the time of inspecting the molded article is set in advance by measurement or the like at five shots expressed by using the number of shots. Thus, a set of molding data including $P1(1)$ and a set of inspection data including $P2(6)$ are extracted and stored in the storage means 18. FIG. 2C shows sets of data stored in the storage means 18. As data when the number of shots is 1, the molding data $M0(1)$, $M1(1)$, ... $Mm(1)$ and the corresponding inspection data $T0(6)$, $T1(6)$ are stored in association with each other as a set. Likewise, as data when the number of shots is 2, the molding data $M0(2)$, $M1(2)$, ... $Mm(2)$ and the corresponding inspection data $T0(7)$, $T1(7)$ are stored in association with each other as a set. In the same manner, the molding data and the inspection data are stored thereafter, and the molding data $M0(N)$, $M1(N)$, ... $Mm(N)$ are stored in association with corresponding inspection data $T0(N+5)$, $T1(N+5)$ as data when the number of shots is N.

When obtaining these data, to accurately detect the pickup position data (the first position of the conveyance part) and the inspection position data (the second position of the conveyance part), it is desirable to temporarily stop the conveyor 40 at the time of picking up the molded article and at the time of inspecting the molded article.

Although this embodiment employs a configuration in which the molding data storage means 12 and the storage means 18 are provided in the injection molding apparatus 10, and the inspection data storage means 34 is provided in the inspection device 30, the configuration is not limited thereto and the molding data storage means 12, the storage means 18, and the inspection data storage means 34 may be provided at any part of the entire injection molding system. In addition, instead of separately providing the molding data storage means 12, the storage means 18, and the inspection data storage means 34, a control means that centrally controls the injection molding apparatus 10, the conveyor 40, and the inspection device 30 may be provided to store the molding data and the inspection data in association with each other as a set on the control means. All of the molding data, the inspection data, the first position of the conveyance part, and the second position of the conveyance part may be obtained in the injection molding apparatus 10 to store the molding data and the inspection data in association with each other as a set on the injection molding apparatus 10. All of the molding data, the inspection data, the first position of the conveyance part, and the second position of the conveyance part may be obtained in the inspection device 30 to store the molding data and the inspection data in association with each other as a set on the inspection device 30.

Figure 3:
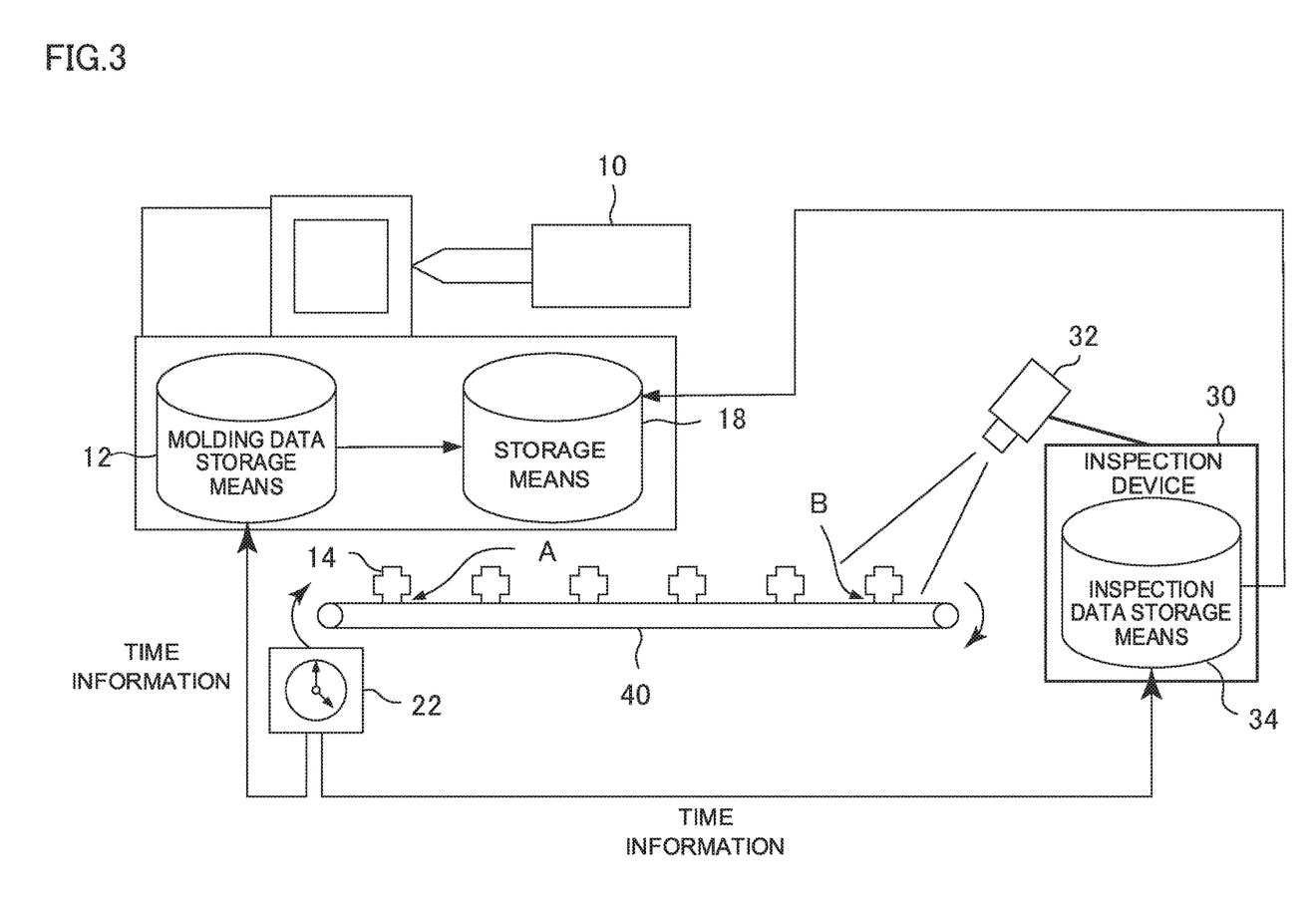
FIG. 3 is a view showing a configuration of an injection molding system according to an embodiment of the invention.

FIG. 3 is a view showing a configuration of an injection molding system according to this embodiment. According to the first embodiment, the molding data and the inspection data are associated with each other by using a difference between the first position and the second position of the conveyance part. This embodiment is different from the first embodiment in that the molding data and the inspection data are associated with each other by using a difference between a first time at which the molded article 14 is picked up from the injection molding apparatus 10 onto the conveyor 40 and a second time at which the inspection device 30 performs inspection of the molded article 14. The description of the same configuration as the injection molding system of the first embodiment shown in FIG. 1 will not be repeated in the following description.

When the molded article 14 is picked up by the conveyor 40 after being molded and ejected by the injection molding apparatus 10, a time detection means 22 detects the time as a first time, and transmits the information on the first time to the molding data storage means 12. The molding data storage means 12 to which the information on the first time has been transmitted stores the molding data regarding the molded article 14 in association with the information on the first time. These processes are repeated every time the molded article 14 is molded and picked up by the conveyor 40.

The molded article 14 conveyed by the conveyor 40 is subjected to inspection such as an appearance inspection and a size inspection based on image processing by the camera 32 of the inspection device 30 at the molded article inspection position B. The time detection means 22 detects the time at which the molded article 14 is inspected by the inspection device 30 as a second time, and transmits the information on the second time to the inspection data storage means 34. The inspection data storage means 34 to which the information on the second time has been transmitted stores the inspection data according the molded article and the transmitted information on the second time in association with each other as a set. These processes are repeated every time the molded article 14 is conveyed and inspected by the inspection device 30 at the molded article inspection position B.

A distance between the molded article pickup position A and the molded article inspection position B is obtained in advance, and based on the obtained distance and the conveyance speed of the conveyor 40, a moving time required to move between the molded article pickup position A and the molded article inspection position B is obtained. A set of data is extracted from each of the sets of the molding data and the information on the first time stored in the molding data storage means 12 and the sets of the inspection data and the second time stored in the inspection data storage means 34 in such a manner that a difference between the first time and the second time is equal to the moving time between the molded article pickup position A and the molded article inspection position B, and the extracted sets of data are stored in the storage means 18.

Figure 4A:
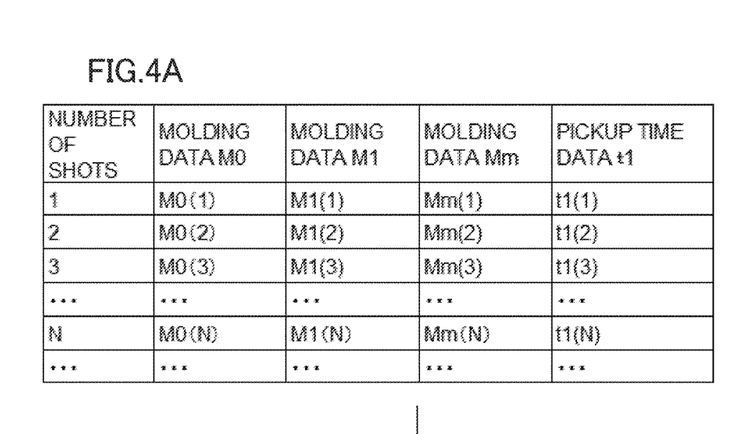
FIG. 4A is a view showing a storage structure of data in each storage means and showing sets of molding data and pickup time data stored in a molding data storage means.
Figure 4B:
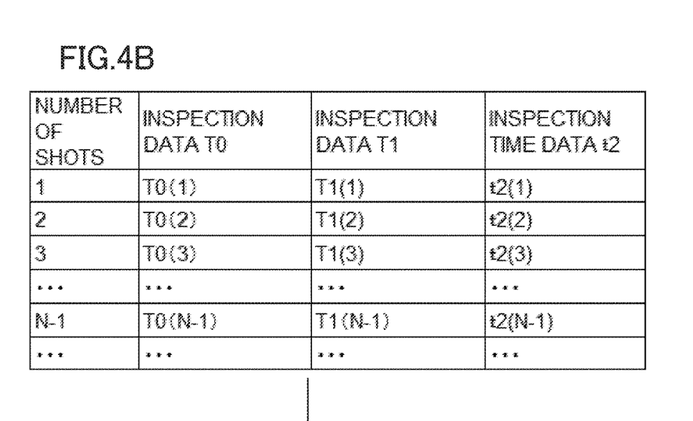
FIG. 4B is a view showing a storage structure of data in each storage means and showing sets of inspection data and inspection time data stored in an inspection data storage means.
Figure 4C:
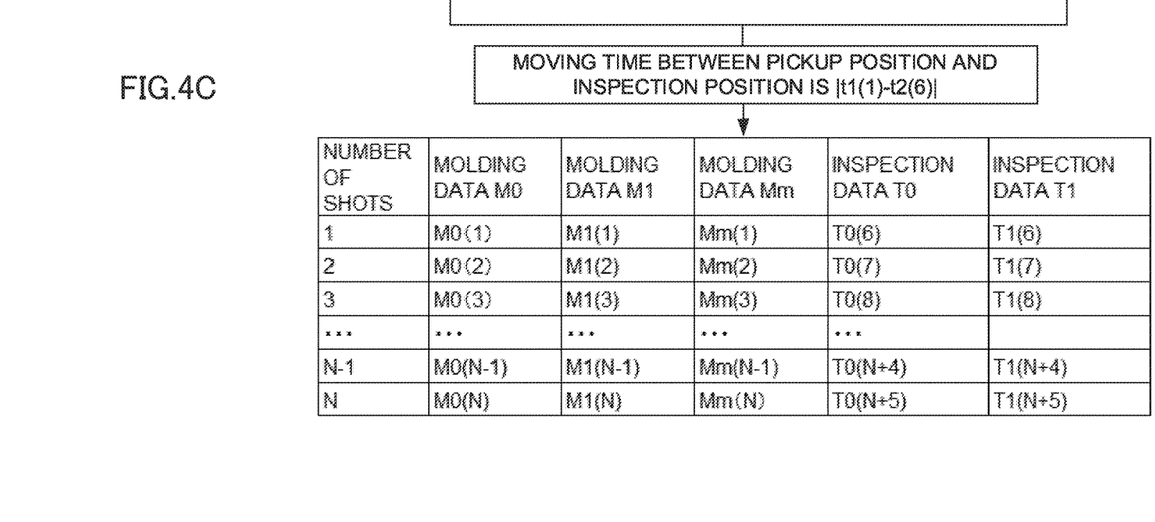
FIG. 4C is a view showing sets of data stored in a storage means.

FIGS. 4A, 4B, and 4C each shows a storage structure of data in each of the storage means according to this embodiment. FIG. 4A shows sets of molding data and pickup time data (the data of the time the molded article 14 is picked up) stored in the molding data storage means 12. For example, the molding data M0(1), M1(1), . . . Mm(1) at the time when the number of shots is 1 are stored in association with t1(1) that is the pickup time data t1 at that moment. When the number of shots is 2, the molding data M0(2), M1(2), . . . Mm(2) are stored in association with t1(2) that is the pickup time data t1 at that moment. Likewise, the molding data and the pickup time data are stored thereafter, and the molding data M0(N), M1(N), . . . Mm(N) at the time when the number of shots is N are stored in association with t1(N) that is the pickup time data t1 at that moment.

The conveyor 40 is operated every time the molded article 14 is picked up by the conveyor 40 or is always operated at a constant speed. The inspection device 30 performs inspection as the molded article 14 is conveyed to the molded article inspection position B. FIG. 4B shows sets of the inspection data and inspection time data (the data of the time the molded article 14 is inspected) stored in the inspection data storage means 34. The inspection data T0(1), T1(1), . . . obtained by inspection are stored in association with t2(1) that is the inspection time data t2 at that moment. Likewise, the inspection data T0(2), T1(2), . . . are stored in association with t2(2) that is the inspection time data t2. Likewise, the inspection data and the inspection time data are stored thereafter, and the inspection data T0(N), T1(N), . . . are stored in association with t2(N) that is the inspection time data t2 at that moment.

In this embodiment, a moving time required to move between the molded article pickup position at the time of producing and picking up the molded article and the molded article inspection position at the time of inspecting the molded article is set in advance by measurement or the like at five shots when expressed by using the number of shots. Thus, a set of molding data including t1(1) and a set of inspection data including t2(6) are extracted and stored in the storage means 18. FIG. 4C shows sets of data stored in the storage means 18. As data when the number of shots is 1, the molding data M0(1), M1(1), . . . Mm(1) and the corresponding inspection data T0(6), T1(6) are stored in association with each other as a set. Likewise, as data when the number of shots is 2, the molding data M0(2), M1(2), . . . Mm(2) and the corresponding inspection data T0(7), T1(7) are stored in association with each other as a set. In the same manner, the molding data and the inspection data are stored thereafter, and the molding data M0(N), M1(N), . . . Mm(N) are stored in association with corresponding inspection data T0(N+5), T1(N+5) as data when the number of shots is N.

Although this embodiment employs a configuration in which the molding data storage means 12 and the storage means 18 are provided in the injection molding apparatus 10, and the inspection data storage means 34 is provided in the inspection device 30, the configuration is not limited thereto and the molding data storage means 12, the storage means 18, and the inspection data storage means 34 may be provided at any part of the entire injection molding system. In addition, instead of separately providing the molding data storage means 12, the storage means 18, and the inspection data storage means 34, a control means that centrally controls the injection molding apparatus 10, the conveyor 40, and the inspection device 30 may be provided to store the molding data and the inspection data in association with each other as a set on the control means. All of the molding data, the inspection data, the first position of the conveyance part, and the second position of the conveyance part may be obtained in the injection molding apparatus 10 to store the molding data and the inspection data in association with each other as a set on the injection molding apparatus 10. All of the molding data, the inspection data, the first time, and the second time may be obtained in the inspection device 30 to store the molding data and the inspection data in association with each other as a set on the inspection device 30. Such configuration is similar to the first embodiment.

When a situation in which the conveyor 40 stops between the pickup position at which the molded article 14 is molded and picked up by the conveyor 40 and the inspection position at which the molded article 14 is inspected on the inspection device 30 occurs for some reason, the molding data and inspection data may be associated with each other by measuring the period of time during which the conveyor 40 is stopped and deducting the measured period of time from the moving time.

Figure 5:
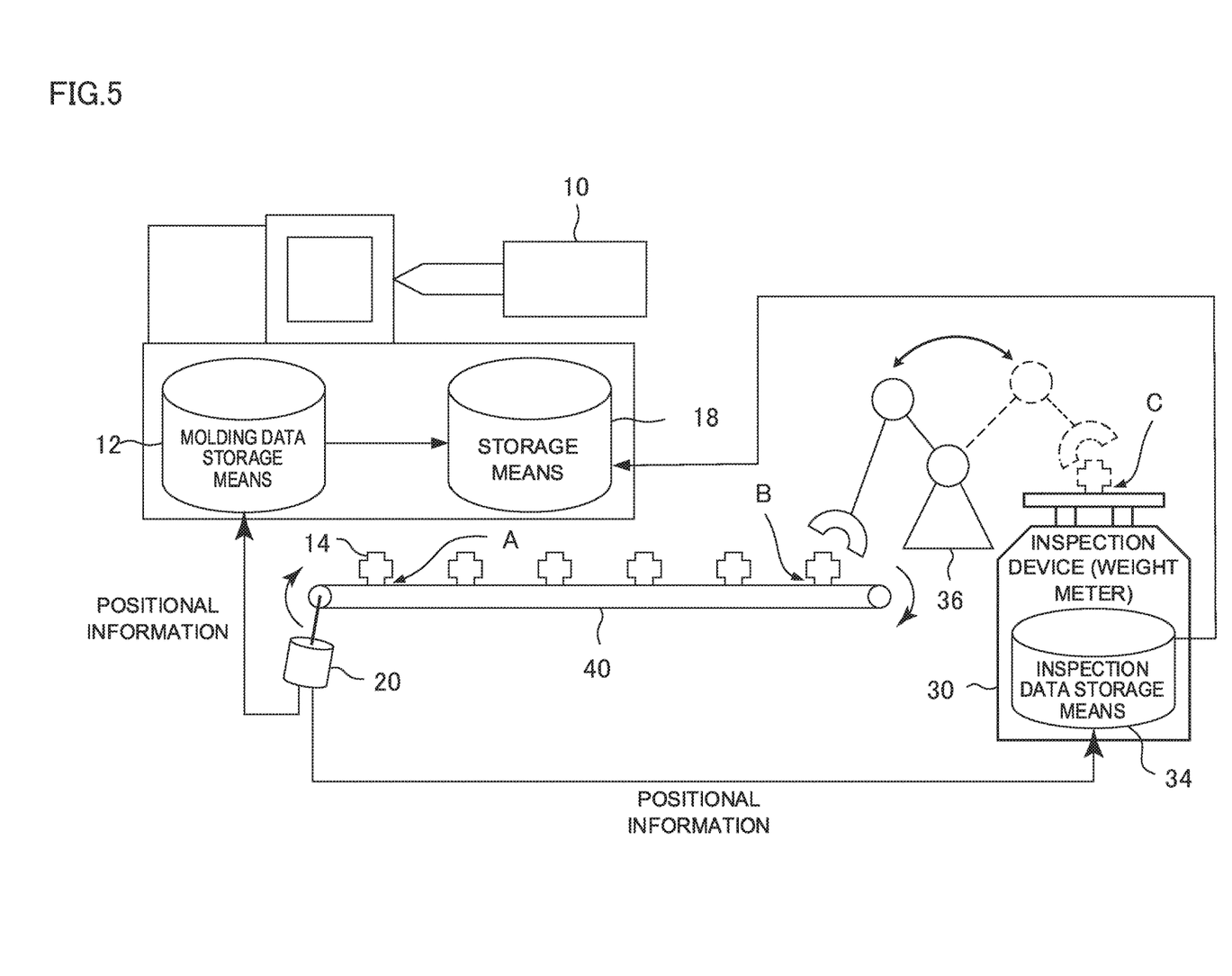
FIG. 5 is a view showing a configuration of an injection molding system according to an embodiment of the invention.

FIG. 5 is a view showing a configuration of an injection molding system according to this embodiment. In this embodiment, a robot 36 that is a moving means is provided at the position where the inspection device is provided in the first and second embodiments. When the molded article 14 is conveyed to the inspection position, the robot 36 carries the molded article 14 to the inspection device 30. The inspection device 30 performs inspection at the position where the molded article 14 is carried. The other configuration is similar to those of the first and second embodiments.

The configuration according to this embodiment is effective particularly when inspection can hardly be performed on the conveyor 40 such as when a weight measurement device or a size measurement device is used as the inspection device 30. The molded article 14 that has been inspected by the inspection device 30 may be returned onto the conveyor 40 or may be carried to another place.

The inspection device 30 according to the above embodiments may include various types of devices capable of inspecting the quality of the molded article 14, such as devices for measuring weight of a molded article, devices for measuring size of a molded article, and devices for acquiring images of a molded article utilizing vision systems.

According to any of the embodiments, a process of storing a set of the molding data and the inspection data in the storage means 18 may be performed at every shot or every time when the inspection of the molded article is completed. Alternatively, the process of storing data may be performed at every predetermined number of shots, for example at every 100 shots to store the data for 100 shots, or may be performed at every predetermined time, for example at every hour to store the data for one hour. The process of storing data may also be performed after a predetermined number of molding processes is completed to store the data for the completed number of molding.

The invention claimed is:
1. An injection molding system, comprising:
an injection molding apparatus;
a conveyance means configured to convey a molded article produced by the injection molding apparatus;
an inspection means configured to inspect the molded article conveyed by the conveyance means;
a conveyance position detection means configured to detect a position of a conveyance part of the conveyance means;
a controller communicated with the injection molding apparatus, the inspection means and the conveyance position detection means; and
a data storage configured to store data,
wherein the data storage is configured to store, under a control of the controller:
molding data when the injection molding apparatus produces the molded article; and
first position information of the conveyance part that is a position of the conveyance part detected by the conveyance position detection means when the produced molded article is picked up by the conveyance means,
the molding data and the first position information of the conveyance part being stored in association with each other as a set, a plurality of sets of the molding data and the first position information being stored in the data storage,
wherein the data storage is further configured to store, under the control of the controller:
inspection data regarding the molded article when a molded article is inspected by the inspection means, and
second position information of the conveyance part that is a position of the conveyance part detected by the conveyance position detection means when the molded article is inspected by the inspection means,
the inspection data and the second position information of the conveyance part being stored in association with each other as a set, a plurality of sets of the inspection data and the second position information of the conveyance part being stored in the data storage,
wherein the data storage is configured to
extract, under the control of the controller, (1) a first set of the molding data and the first position information of the conveyance part and (2) a second set of the inspection data and the second position information of the conveyance part, respectively from (i) the plurality of sets of the molding data and the first position information of the conveyance part and (ii) the plurality of sets of the inspection data and the second position information of the conveyance part, wherein the first position information and the second position information of the conveyance part have a difference equal to a predetermined distance between (a) a pickup position where the molded article is picked up by the conveyance means and (b) an inspection position where the molded article is inspected by the inspection means, and
store (1) the molding data included in the extracted first set of the molding data and the first position information and (2) the inspection data included in the extracted second set of the inspection data and the second position information in association with each other, and wherein the controller is configured to determine the molded article as non-defective or as defective by using (1) the stored molding data included in the extracted first set and (2) the stored inspection data included in the extracted second set in association with each other.

2. The injection molding system according to claim 1,
wherein the inspection means includes an inspection device configured to inspect the molded article and a moving means configured to move the molded article,
wherein the moving means is configured to move the molded article from the inspection position to the inspection device, and
wherein the inspection device is configured to inspect the molded article moved by the moving means and obtain the inspection data.

3. The injection molding system according to claim 2, wherein the moving means is a robot.

4. The injection molding system according to claim 1, wherein the conveyance means is configured to stop at the time of picking up the molded article.

5. An injection molding system, comprising:
an injection molding apparatus;
a conveyance means configured to convey a molded article produced by the injection molding apparatus;
an inspection means configured to inspect the molded article conveyed by the conveyance means;
a timer configured to detect current time;
a controller communicated with the injection molding apparatus, the inspection means and the timer; and
a data storage configured to store data,
wherein the data storage is configured to store, under a control of the controller:
  molding data when the injection molding apparatus produces a molded article; and
  first time information that is a time detected by the timer when the produced molded article is picked up by the conveyance means,
  the molding data and the first time information being stored in association with each other as a set, a plurality of sets of the molding data and the first time information being stored in the data storage,
wherein the data storage is further configured to store, under the control of the controller:
  inspection data when a molded article is inspected by the inspection means; and
  second time information that is a time detected by the timer when the molded article is inspected by the inspection means,
  the inspection data and the second time information being stored in association with each other as a set, a plurality of sets of the inspection data and the second time information being stored in the data storage,
wherein the data storage is configured to
  extract, under the control of the controller, (1) a first set of the molding data and the first time information and (2) a second set of the inspection data and the second time information, respectively from (i) the plurality of sets of the molding data and the first time information and (ii) the plurality of sets of the inspection data and the second time information, wherein the first time information and the second time information have a difference equal to a moving time required to move between (a) a pickup position where the molded article is picked up by the conveyance means and (b) an inspection position where the molded article is inspected by the inspection means, the moving time being obtained based on a distance between the pickup position and the inspection position and a conveyance speed of the conveyance means, and
  store (1) the molding data included in the extracted first set of the molding data and the first time information and (2) the inspection data included in the extracted second set of the inspection data and the second time information in association with each other, and
wherein the controller is configured to determine the molded article as non-defective or as defective by using (1) the stored molding data included in the extracted first set and (2) the stored inspection data included in the extracted second set in association with each other.

6. The injection molding system according to claim 5, wherein the conveyance means is configured to stop at the time of inspecting the molded article.

7. The injection molding system according to claim 5,
wherein the inspection means includes an inspection device configured to inspect the molded article and a moving means configured to move the molded article,
wherein the moving means is configured to move the molded article from the inspection position to the inspection device, and
wherein the inspection device is configured to inspect the molded article moved by the moving means and obtain the inspection data.

8. The injection molding system according to claim 7, wherein the moving means is a robot.

* * * * *